(12) United States Patent
Davies

(10) Patent No.: US 10,830,336 B2
(45) Date of Patent: Nov. 10, 2020

(54) BALLSCREW LUBRICATION

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 30 days.

(21) Appl. No.: 15/956,857

(22) Filed: Apr. 19, 2018

(65) Prior Publication Data

US 2018/0306310 A1   Oct. 25, 2018

(30) Foreign Application Priority Data

Apr. 21, 2017   (EP) .................................... 17275057

(51) Int. Cl.
*F16H 57/04* (2010.01)
*F16H 25/22* (2006.01)

(52) U.S. Cl.
CPC ..... *F16H 57/0497* (2013.01); *F16H 25/2214* (2013.01); *F16H 25/2228* (2013.01)

(58) Field of Classification Search
CPC ............. F16H 57/0497; F16H 25/2228; F16H 25/2214
See application file for complete search history.

(56) References Cited

U.S. PATENT DOCUMENTS

| | | | | |
|---|---|---|---|---|
| 4,795,172 A | * | 1/1989 | Brande | F16H 25/2418 277/354 |
| 5,551,314 A | * | 9/1996 | Andrzejewski, Jr. | F16H 25/2266 411/424 |
| 7,946,018 B2 | | 5/2011 | Tokura et al. | |
| 2001/0018850 A1 | * | 9/2001 | Walton | F16C 33/3713 74/89.44 |
| 2002/0056333 A1 | * | 5/2002 | Ohya | F16H 25/2418 74/424.81 |
| 2002/0172733 A1 | * | 11/2002 | Takanohashi | B29C 45/83 425/107 |

(Continued)

FOREIGN PATENT DOCUMENTS

| | | |
|---|---|---|
| JP | H0478358 A | 3/1992 |
| JP | 2004353837 A | 12/2004 |
| SU | 1597485 A1 | 10/1990 |

OTHER PUBLICATIONS

Extended European Search Report for International Application No. 17275057.2 dated Oct. 25, 2017, 5 pages.

*Primary Examiner* — Zakaria Elahmadi
(74) *Attorney, Agent, or Firm* — Cantor Colburn LLP

(57) ABSTRACT

A re-circulating ballscrew assembly comprises a plurality of balls. A ballnut has a ballnut body with a radially inner surface and a helical ballnut groove formed on the radially inner surface. A ballscrew is disposed within the ballnut, the ballscrew comprising a radially outer surface and a ballscrew groove formed on the outer surface, the ballscrew groove cooperating with the ballnut groove to define a helical raceway for the plurality of balls, the helical raceway having a start point and an end point. The ballscrew assembly comprises a return track for the plurality of balls, the return track disposed radially outward of the radially inner surface of the ballnut and connecting the start point and the end point of the helical raceway. The return track extends at least in part through an annular lubricant bath.

4 Claims, 2 Drawing Sheets

(56) References Cited

U.S. PATENT DOCUMENTS

| | | | |
|---|---|---|---|
| 2002/0185336 A1* | 12/2002 | West | F16H 25/2214 |
| | | | 184/5 |
| 2003/0000766 A1* | 1/2003 | Tatewaki | B62D 5/0424 |
| | | | 180/444 |
| 2006/0169079 A1* | 8/2006 | Lee | F16H 25/2233 |
| | | | 74/424.82 |
| 2007/0137349 A1* | 6/2007 | Tokura | B23P 19/001 |
| | | | 74/424.86 |
| 2008/0134816 A1 | 6/2008 | Chen et al. | |
| 2009/0071272 A1 | 3/2009 | Lin et al. | |
| 2010/0236346 A1 | 9/2010 | Osterlaenger et al. | |
| 2012/0144944 A1* | 6/2012 | Yamamoto | F16H 57/0412 |
| | | | 74/424.81 |
| 2014/0260747 A1* | 9/2014 | Kuroiwa | F16H 25/2418 |
| | | | 74/424.81 |
| 2015/0184696 A1* | 7/2015 | Chang | F16C 33/6659 |
| | | | 384/13 |

\* cited by examiner

BALLSCREW LUBRICATION

FOREIGN PRIORITY

This application claims priority to European Patent Application No. 17275057.2 filed Apr. 21, 2017, the entire contents of which is incorporated herein by reference.

TECHNICAL FIELD

The present disclosure relates to ballscrew actuators, and in particular to lubricated return tracks for ballscrew actuators.

BACKGROUND

It is known to use ballscrew actuators to translate a rotational displacement into an axial displacement while minimising frictional losses. Ballscrew actuators are used in a variety of applications, including in aircraft and aircraft engines.

Ballscrew actuators are generally lubricated in order to facilitate relative motion between the screw, nut and ball bearings. It is desirable to provide the lubricant in an effective manner to ensure lubrication of all contact surfaces within the ballscrew.

SUMMARY

According to one embodiment of the present disclosure, there is provided a re-circulating ballscrew assembly. The ballscrew assembly comprises a plurality of balls. The ballscrew assembly further comprises a ballnut having a ballnut body with a radially inner surface and a helical ballnut groove formed on the radially inner surface. The ballscrew assembly further comprises a ballscrew disposed within the ballnut, the ballscrew comprising a radially outer surface and a ballscrew groove formed on the outer surface, the ballscrew groove cooperating with the ballnut groove to define a helical raceway for the plurality of balls, the helical raceway having a start point and an end point. The ballscrew assembly further comprises a return track for the plurality of balls, the return track disposed radially outward of the radially inner surface of the ballnut and connecting the start point and the end point of the helical raceway. The return track extends at least in part through an annular lubricant bath formed in an annular cavity defined radially outwardly of the radially inner surface between a radially outer surface of the ballnut body and an annular sleeve surrounding the ballnut body, wherein the return track is defined by respective grooves formed on a radially inner surface of the annular sleeve and a radially outer surface of the ballnut body.

The annular cavity may be at least partially filled with an oil or grease lubricant to form the annular lubricant bath.

The annular sleeve may comprise an annular static seal in sealing contact with the radially outer surface of the ballnut body.

The ballscrew assembly may further comprise a plurality of pressure-balancing ports extending through the ballnut body to form passages from the annular cavity to the radially inner surface of the ballnut body. The plurality of ports may be distributed axially along the ballnut body. The helical ballscrew groove may form a corresponding helical ridge, wherein the plurality of ports include openings on the radially inner surface of the ballnut body, and wherein the openings are aligned with the helical ridge. Each of the plurality of pressure-balancing ports may have a diameter that is less than the diameter of the plurality of balls.

The ballnut may be arranged around a central axis, wherein the return track forms a straight path parallel to the axis.

The return track may form a helical curve that extends around a portion of a circumference of the ballnut. The return track may extend at least one full turn around the circumference of the ballnut.

The ballnut groove may define a plurality of helical raceways, and wherein the assembly comprises a plurality of return tracks, each return track joining the start and end points of one of the helical raceways.

According to another embodiment of the present disclosure, there is provided a method of assembling a ballscrew assembly. The method comprises providing a ballnut having a ballnut body with a radially inner surface and a helical ballnut groove formed on the radially inner surface. The method further comprises arranging a ballscrew within the ballnut, the ballscrew comprising a radially outer surface and a ballscrew groove formed on the outer surface, the ballscrew groove cooperating with the ballnut groove to define a helical raceway, the helical raceway having a start point and an end point. The method further comprises arranging an annular sleeve surrounding the ballnut body, a radially inner surface of the annular sleeve a radially outer surface of the ballnut body at least partially defining an annular lubricant bath formed in an annular cavity, wherein a return track is defined by respective grooves formed on the radially inner surface of the annular sleeve and the radially outer surface of the ballnut body, the return track connecting the start point and end point of the helical raceway. The method further comprises arranging a plurality of balls within the helical raceway and the return track.

The method may further comprise arranging an annular static seal between the annular sleeve and the ballnut body to form a sealing contact.

BRIEF DESCRIPTION OF THE DRAWINGS

An embodiment of the present disclosure will now be described by way of example only, and with reference to the following drawings in which.

DETAILED DESCRIPTION

Figure 1:
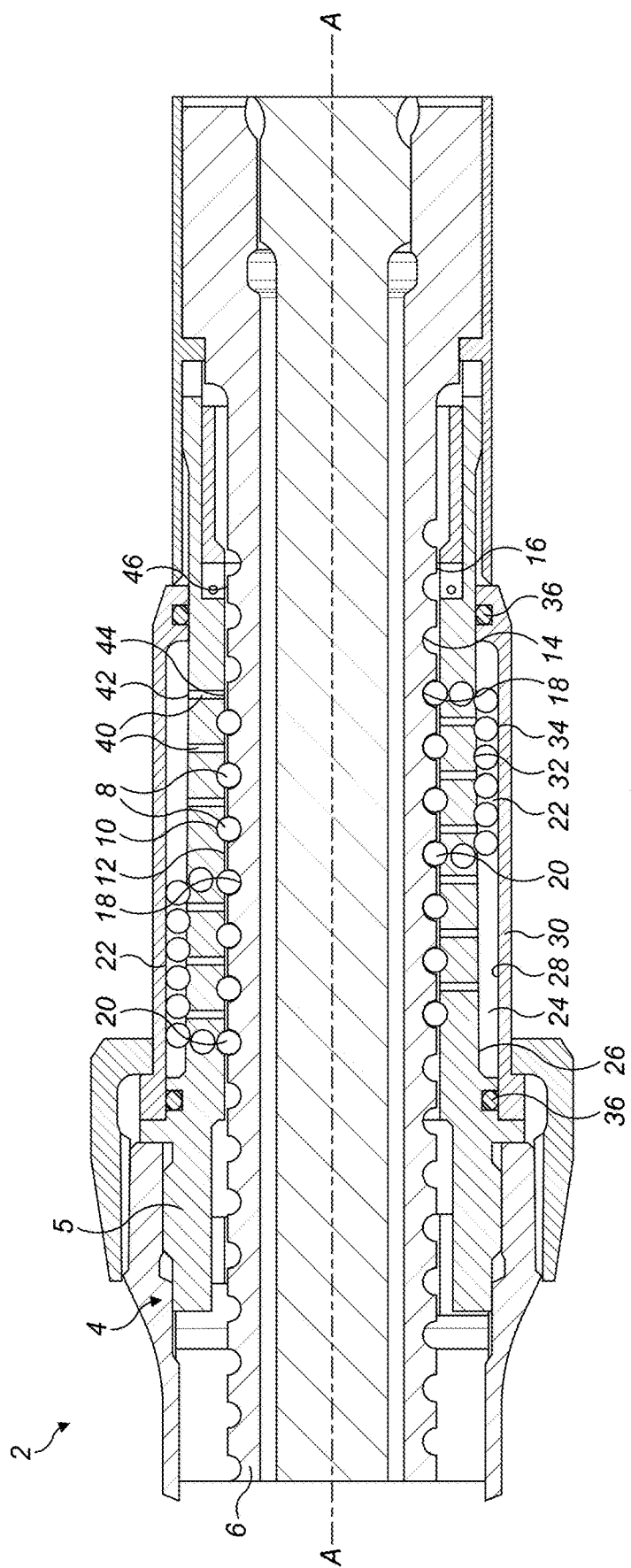
FIG. 1 shows a view of a ballscrew actuator in accordance with this disclosure.

FIG. 1 shows a ballscrew assembly 2 comprising a ballnut 4, a ballscrew 6 and a plurality of balls 8. The ballnut 4 has a ballnut body 5, the ballnut body including a helical groove 10 formed on a radially inner surface 12. The ballscrew 6 includes a corresponding helical groove 14 formed on a radially outer surface 16. The ballscrew 6 is disposed within the ballnut 4, and the balls 8 sit between the ballscrew 6 and the ballnut body 5, within the helical grooves 10, 14. The ballscrew 6 can rotate within the ballnut body 5, which causes the ballscrew 6 to move along a shared axis A of the ballnut body 5 and ballscrew 6.

The helical grooves 10, 14 on the ballnut body 5 and ballscrew 6 define a helical raceway for the balls 8. As the ballscrew 6 rotates, the balls 8 progress through the helical raceway from a first end 18 to a second end 20, or vice-versa.

The balls 8 are then returned to a respective end 18 or 20 of the helical raceway, in the opposite direction to the movement of the ballscrew 6, to provide a continuous circulation of balls. The balls 8 are returned via a return track 22, which extends radially exterior to the helical raceway.

Figure 2:
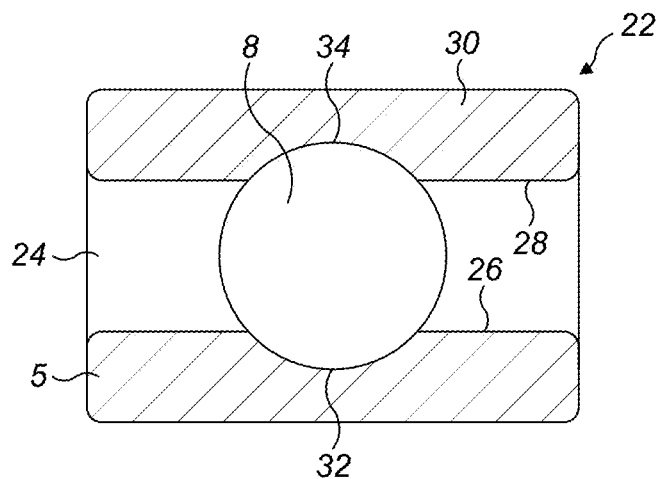
FIG. 2 shows another view of the ballscrew actuator of FIG. 1.
Figure 3:
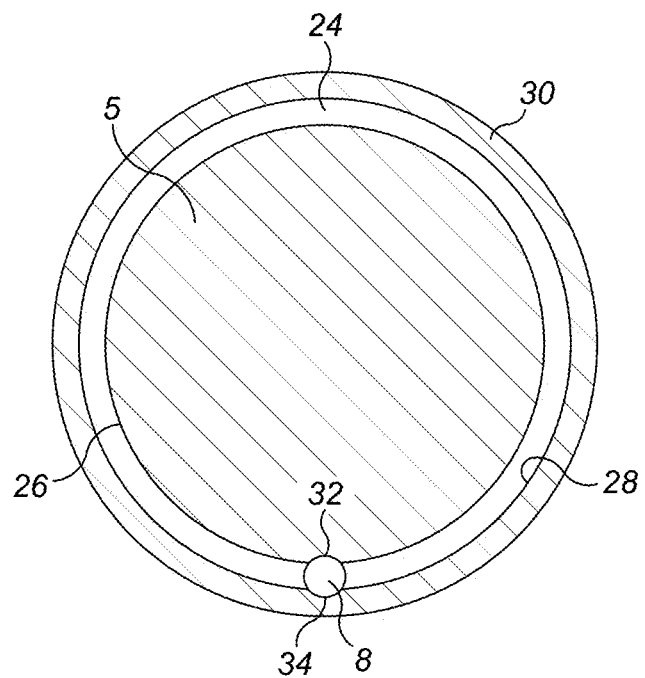
FIG. 3 shows a cross-sectional view of the ball screw actuator of FIG. 2.

The return track 22 may be formed within an annular cavity 24, as shown in FIGS. 1, 2 and 3. The radially inner surface of the annular cavity 24 is defined by a radially outer surface 26 of the ballnut body 5, while the radially outer surface of the annular cavity 24 is defined by a radially inner surface 28 of an annular sleeve 30 arranged around the ballnut body 5. The radially inner surface 28 of the annular sleeve 30 and the radially outer surface 26 of the ballnut body 5 comprise respective grooves 32 and 34, which correspond to the shape of the balls 8 and define the return track 22 through which the balls 8 pass.

The grooves 32 and 34, and hence the return track 22, may extend through a partial helical turn, a single full helical turn, or multiple helical turns. Alternatively, the grooves 32, 34 may extend parallel to the ballscrew axis A.

The ballscrew assembly 2 may comprises a plurality of helical raceways and a plurality of return tracks 22, each return track 22 joining a first and second end of a respective helical raceway to provide a continuous circuit. Each return track 22 is defined by a respective pair of grooves 32, 34 formed on the radially inner surface 28 of the annular sleeve 30 and the radially outer surface 26 of the ballnut body 5. In the embodiment illustrated, there are two helical raceways and two return tracks 22.

The ballnut 4, ballscrew 6 and balls 8 are lubricated to facilitate their relative movement. The ballscrew assembly 2 may use an oil lubricant, or a grease lubricant. Lubricant can be provided to the ballscrew assembly 2 particularly effectively by applying lubricant to the balls 8. To provide spatial efficiency, the lubricant can be applied to the balls 8 within the return track 22 of the ballscrew assembly 2.

In the case of the annular return track 22, the lubricant can be applied by partially or completely filling the annular cavity 24 with lubricant. This forms an annular lubricant bath, through which the balls 8 pass as they progress through the return track 22. The annular lubricant bath evenly coats the surface of the balls 8 to provide effective lubrication.

The annular cavity 24 may be sealed to prevent leakage and subsequent wastage of lubricant. The annular sleeve 30 may comprise annular static seals 36 at one, or both, axial ends of the annular cavity 24.

By filling the annular cavity 24 with lubricant, an adverse pressure gradient may be formed between the annular cavity 24 and the helical raceway of the ballnut body 5 and ballscrew 6. Pressure-balancing ports 40 may therefore be provided to connect the annular cavity 24 and the helical raceway.

The ports 40 extend through the body of the ballnut body 5, from an outer opening 42 in the radially outer surface 26 of the ballnut body 5, to an inner opening 44 on the radially inner surface 12 of the ballnut body 5. The ports 40 thereby fluidly connect the annular cavity 24 to the helical raceway.

The ports 40 may, as shown, be distributed axially with respect to the axis A of the ballnut 4, such that each port 40 is axially separated from an adjacent port 40.

The helical groove 10 of the ballnut body 5 forms a respective helical ridge 46. Each of the ports 40 may be arranged so that the inner opening 44 thereof is aligned with the helical ridge 46. Each port 40 may be associated with a single full turn of the helical ridge 46.

The ports 40 are sized to allow pressure-equalisation. The ports 40 may generally have a diameter that is less than that of the balls 8. The ports 40 are located a circumferential distance separate from the return track 22 in order to prevent the ports 40 interfering with the passage of the balls 8.

It will be understood that the above description is of non-limiting embodiments of the disclosure. Changes and modifications can be made thereto without departing from the scope of the disclosure which is defined by the following claims.

The invention claimed is:

1. A re-circulating ballscrew assembly comprising:
   a plurality of balls;
   a ballnut having a ballnut body with a radially inner surface and a helical ballnut groove formed on the radially inner surface;
   a ballscrew disposed within the ballnut, the ballscrew comprising a radially outer surface and a ballscrew groove formed on the outer surface, the ballscrew groove cooperating with the ballnut groove to define a helical raceway for the plurality of balls, the helical raceway having a start point and an end point;
   a return track for the plurality of balls, the return track disposed radially outward of the radially inner surface of the ballnut and connecting the start point and the end point of the helical raceway;
   wherein the return track extends at least in part through an annular lubricant bath formed in an annular cavity defined radially outwardly of the radially inner surface between a radially outer surface of the ballnut body and an annular sleeve surrounding the ballnut body, wherein the return track is defined by respective grooves formed on a radially inner surface of the annular sleeve and a radially outer surface of the ballnut body; and
   a plurality of pressure-balancing ports extending through the ballnut body to form passages from the annular cavity to the radially inner surface of the ballnut body.

2. The ballscrew assembly of claim 1, wherein the plurality of ports are distributed axially along the ballnut body.

3. The ballscrew assembly of claim 2, wherein the helical ballscrew groove forms a corresponding helical ridge, wherein the plurality of ports include openings on the radially inner surface of the ballnut body, and wherein the openings are aligned with the helical ridge.

4. The ballscrew assembly of claim 1, wherein each of the plurality of pressure-balancing ports has a diameter that is less than the diameter of the plurality of balls.

* * * * *